(12) United States Patent
Bitar

(10) Patent No.: US 8,498,296 B2
(45) Date of Patent: *Jul. 30, 2013

(54) LABEL AND EXP FIELD BASED MPLS NETWORK DEVICE

(75) Inventor: Nabil N Bitar, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 322 days.

This patent is subject to a terminal disclaimer.

(21) Appl. No.: 12/976,455

(22) Filed: Dec. 22, 2010

(65) Prior Publication Data

US 2011/0090916 A1   Apr. 21, 2011

Related U.S. Application Data

(63) Continuation of application No. 11/876,317, filed on Oct. 22, 2007, now Pat. No. 7,889,739.

(51) Int. Cl.
*H04L 12/28* (2006.01)
*H04L 12/56* (2006.01)

(52) U.S. Cl.
USPC ....... 370/392; 370/395.31; 370/400; 370/413

(58) Field of Classification Search
USPC ............. 370/389, 392, 395.31, 400, 412–418
See application file for complete search history.

(56) References Cited

U.S. PATENT DOCUMENTS

| | | |
|---|---|---|
| 2001/0033581 A1 | 10/2001 | Kawarai et al. |
| 2002/0078196 A1 | 6/2002 | Kim et al. |
| 2002/0099849 A1 | 7/2002 | Alfieri et al. |
| 2004/0008714 A1 | 1/2004 | Jones |
| 2006/0168279 A1 | 7/2006 | Lee et al. |
| 2006/0239188 A1 * | 10/2006 | Weiss et al. .................. 370/229 |
| 2007/0133559 A1 | 6/2007 | Ko et al. |
| 2008/0291916 A1 | 11/2008 | Xiong et al. |

* cited by examiner

*Primary Examiner* — Ronald Abelson

(57) ABSTRACT

A network device receives a label-switched-path (LSP) labeled data packet, maps the LSP labeled data packet to an input queue, maps a data packet in the input queue to an output queue based on a received LSP label value and a received exp label value, and transmits the LSP labeled data packet from the output queue.

20 Claims, 7 Drawing Sheets

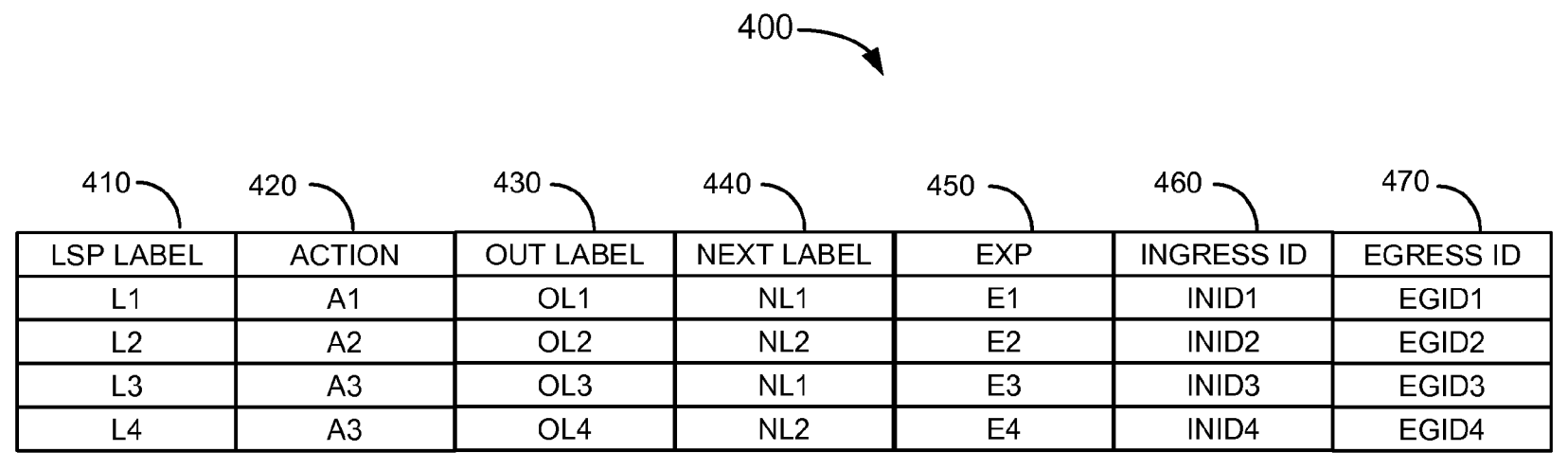

| LSP LABEL | ACTION | OUT LABEL | NEXT LABEL | EXP | INGRESS ID | EGRESS ID |
|---|---|---|---|---|---|---|
| L1 | A1 | OL1 | NL1 | E1 | INID1 | EGID1 |
| L2 | A2 | OL2 | NL2 | E2 | INID2 | EGID2 |
| L3 | A3 | OL3 | NL1 | E3 | INID3 | EGID3 |
| L4 | A3 | OL4 | NL2 | E4 | INID4 | EGID4 |

FIG. 4

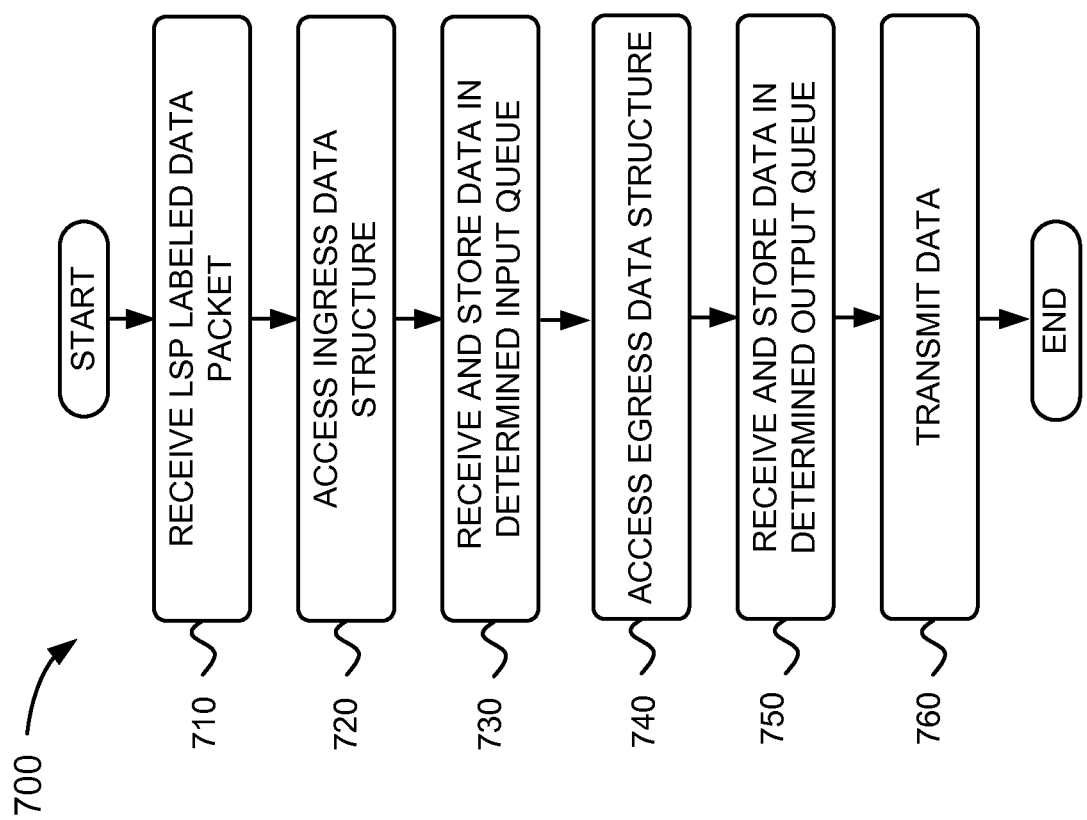

LABEL AND EXP FIELD BASED MPLS NETWORK DEVICE

RELATED APPLICATION

This application is a continuation of U.S. patent application Ser. No. 11/876,317, filed on Oct. 22, 2007, the disclosure of which is incorporated herein by reference.

BACKGROUND INFORMATION

Typically, a data packet received in a Multiprotocol Label Switching (MPLS) network device may be transmitted between network devices in accordance with a label switched path (LSP) label attached to the data packet. Existing methods of processing the data packet at each network device may involve using the LSP label applied to the received data packet or an exp field value contained in the received labeled data packet to determine the queue on which the packet needs to be enqueued within the device to the device switching fabric and on egress transmission links to the next device. That is, the label or exp value determines the scheduling behavior, associated with the queue, at a network device. A queue is normally allocated a scheduling priority relative to other queues on the same transmission link or a bandwidth share on that link. While such packet processing capabilities provide for differentiated treatments of packets, they are insufficient. With exp-based queuing of labeled packets, all labeled packets with the same exp value share the same queue but an LSP can carry traffic that receive one or more scheduling behaviors. With label-based queuing of LSPs, an LSP can carry traffic from one scheduling class. Therefore, there is a need to determine the scheduling class of an LSP labeled data packet based on both the LSP label and exp value.

BRIEF DESCRIPTION OF THE DRAWINGS

FIG. 4 is an exemplary data structure that may be stored in the exemplary network device shown in FIG. 3;

FIG. 7 is flow diagram illustrating exemplary processing capable of being performed by the network device of FIG. 3.

DETAILED DESCRIPTION

The following detailed description of the exemplary embodiments refers to the accompanying drawings. The same reference numbers in different drawings may identify the same or similar elements. Also, the following detailed description does not limit the embodiments.

Figure 1:
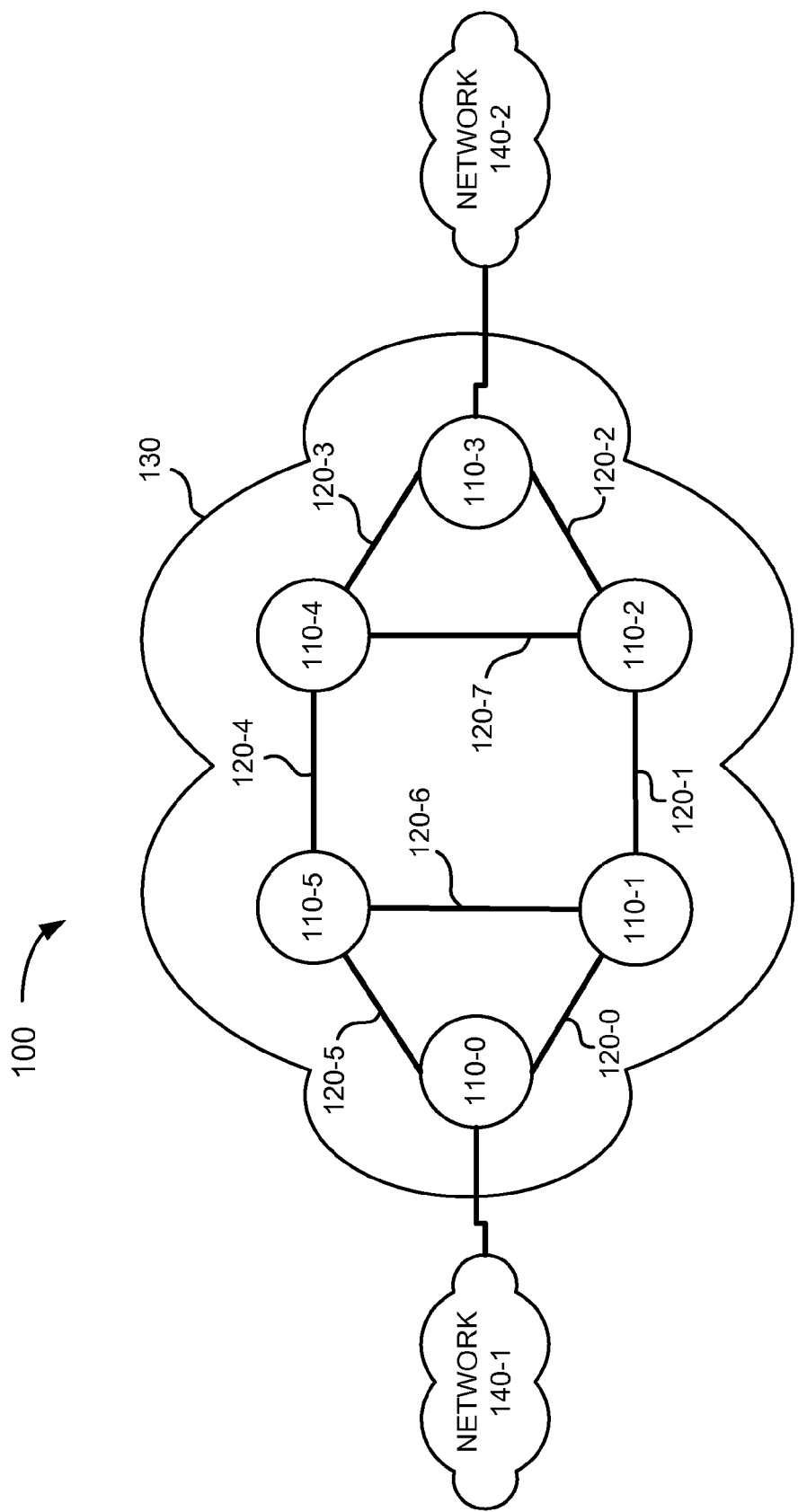
FIG. 1 is a diagram illustrating an exemplary system in which embodiments described herein may be implemented.

FIG. 1 is a diagram illustrating an exemplary system 100 in which embodiments described herein may be implemented. In one implementation, system 100 may include, for example, a group of network devices 110-1, 110-2, 110-3 and 110-4 (referred to collectively as "network devices 110"), connected by a group of links 120-1, 120-2, 120-3 and 120-4 (referred to collectively as "links 120") that may form a network 130. System 100 may further include a group of networks 140-1 and 140-2 (referred to collectively as "networks 140") connected to network 130. The number of components shown in system 100 is exemplary. In practice, system 100 may include more or fewer components than shown in FIG. 1.

Each of network devices 110 may include any network device, such as a computer, a router, a switch, a network interface card (NIC), a hub, a bridge, etc. In one implementation, network devices 110 may include label switching routers (LSRs). Each network device 110 may include one or more input ports and output ports that permit communications with other network devices 110. Network devices 110 may be connected via links 120. Links 120 may include one or more paths that permit communications between network devices 110, such as wired and/or wireless connections. A network device 110, configured as an LSR, for example, may receive a label data packet from another network device 110. Each network device 110, configured as an LSR along a label switched path (LSP), may make a forwarding decision based on the LSP label of the data packet. That is, the data packet forwarding process may be based on the concept of label switching. In this way, a LSP may identify the specific path of network devices 110 and links 120 that a data packet may take through an MPLS network (e.g., network 130). The labeled data packet may be forwarded along the LSP by each network device 110, for example, until it eventually arrives at a specific network device 110 that may be configured as an egress LSR. The LSP label may be removed from the data packet by either an egress network device 110 or by the LSR network device 110 preceding the egress network device 110.

To optimize the route or path selection process, the physical path of an LSP may not be restricted to the shortest path that one or more network devices executing an interior gateway protocol (IGP) would select to reach a destination. The physical path for a LSP may be defined using an explicit route. An explicit route may be a preconfigured sequence of network devices 110 (e.g., LSRs) that define the physical path of the LSP. Explicit routes may allow physical paths to be defined that override the shortest path routes established by conventional Internet Protocol (IP) routing (e.g., by IGPs). For example, explicit routes may be used to route traffic around congested points in network 130, to optimize resource utilization across network 130, and/or to satisfy network and administrative policy constraints.

Network 130 may include a group of network devices 110 interconnected by links 120 that form an MPLS network, as described above, for example. While six network devices 110 and eight links 120 are shown in network 130, more or fewer network devices 110 and links 120 may be used in other implementations consistent with the embodiments described herein.

Networks 140 may include one or more networks including IP networks, metropolitan area networks (MANs), wide area networks (WANs), local area networks (LANs), or a combination of networks. Networks 140 may also include devices, such as switches, routers, firewalls, gateways, and/or servers (not shown), used to transmit/receive data to/from other connected network devices. Networks 140 may be a hardwired network using wired conductors and/or optical fibers and/or may be a wireless network using free-space optical and/or radio frequency (RF) transmission paths. Implementations of networks 140 and/or devices operating on networks 140 described herein are not limited to any particular data type and/or protocol.

Figure 2:
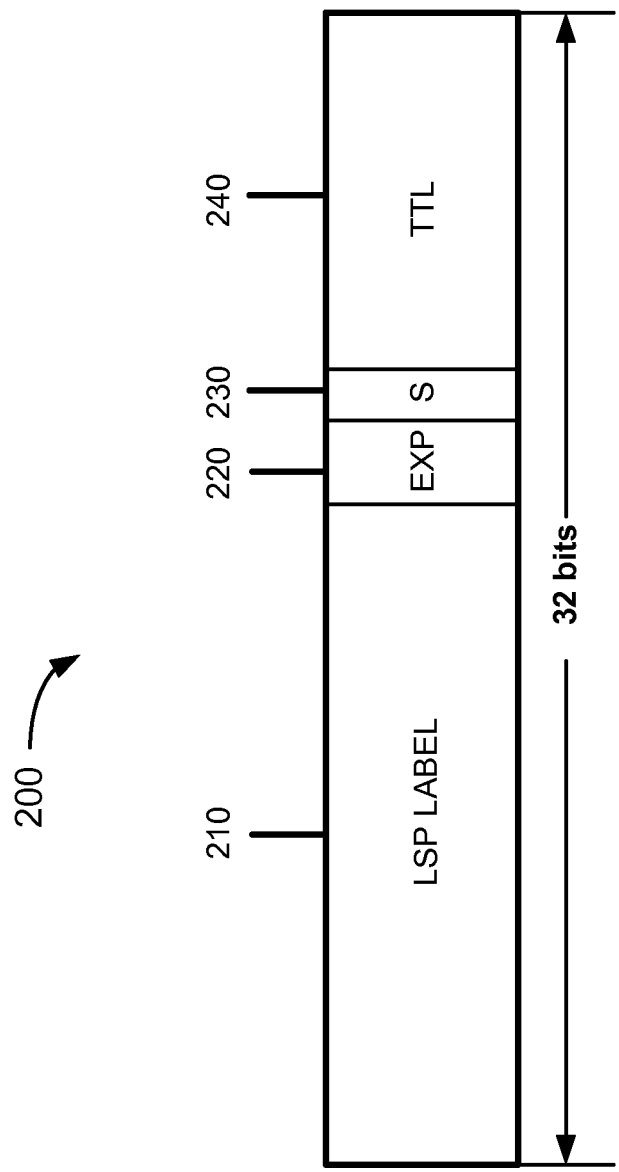
FIG. 2 is a diagram of an exemplary MPLS label header used to transport data within the system shown in FIG. 1.

FIG. 2 is a diagram of an MPLS label header 200 that may be used to transmit data through system 100. For example, MPLS label header 200 includes an LSP label field 210, an exp field 220, a stack (S) field 230, and a time-to-live (TTL) field 240.

LSP label field 210 contains twenty bits of information that forms a LSP label used to forward a data packet through an MPLS network, such as network 130. As described above for example, the LSP label contained in LSP label field 210 may indicate or identify a network device 110 that may receive the transmitted data packet.

Exp field 220 contains three bits of information that may be used by network device 110 to identify queues for storing received labeled data packets as described in detail below and/or determine the drop priority of the packet.

Stack (S) field 230 contains one bit of information that indicates if this label is stacked onto another label.

Time-to-Live (TTL) field 240 contains eight bits of information that indicates how many additional nodes a labeled packet can traverse.

Figure 3:
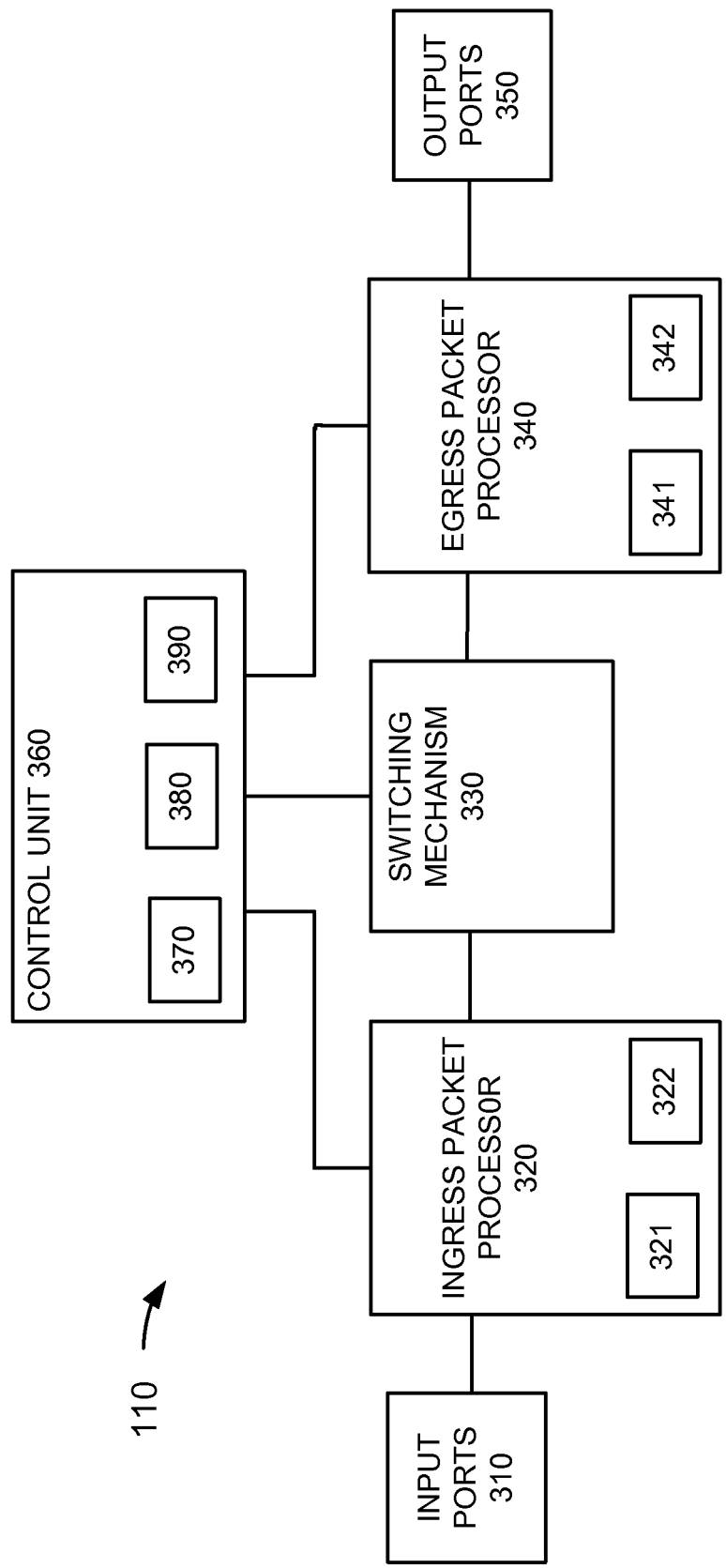
FIG. 3 a diagram of one exemplary network device of FIG. 1.

FIG. 3 is a diagram of an exemplary network device which may correspond to one of network devices 110. As illustrated, network device 110 may include input ports 310, an ingress packet processor 320, a switching mechanism 330, an egress packet processor 340, output ports 350, and a control unit 360.

Input ports 310 may connect network device 110 to networks 130 and 140 for receipt of data. For example, input ports 310 may receive data from a network, such as network 140. Input ports 310 may include logic to carry out datalink layer encapsulation and decapsulation. Input ports 310 may also connect to an ingress packet processor 320.

Ingress packet processor 320 may include logic to forward received data to switching mechanism 330. Ingress packet processor 320 may receive data from networks 130 and 140 via input ports 310 and may run datalink-level protocols and/or a variety of higher level protocols. For example, input ports 310 of network device 110-0 may receive data via links 120-0 and 120-5, and may receive data packets from network 140-1, as shown in FIG. 1. Ingress packet processor 320 may perform packet processing operations to determine how to forward a packet. Ingress packet processor 320 may also include ingress memory 321 that may store a label information base (LIB) that includes an ingress data structure as described in FIG. 4. Ingress packet processor 320 may also include an ingress Traffic Manager 322 and associated input queues connected to the switching mechanism 330 and an associated scheduler.

Switching mechanism 330 may receive data from ingress packet processor 320 and may determine a connection to an egress packet processor 340. Switching mechanism 330 may perform switching by accessing switching memory 390 in order to switch data to an egress packet processor 340. Switching mechanism 330 may be implemented using many different techniques. For example, switching mechanism 330 may include busses, crossbars, queues and/or shared memories. In one implementation, switching mechanism 330 may include a bus that links input ports 310 and output ports 350. A crossbar may provide multiple simultaneous data paths through switching mechanism 330. In a shared-memory switching mechanism 330, incoming data packets may be stored in a shared memory and pointers to datagrams may be switched.

Egress packet processor 340 receives packets switched using switching mechanism 330. Egress packet processor 340 may include egress packet processing logic, an egress memory 341 for storing an egress data structure used in packet processing and an egress Traffic Manager 342 with associated output queues connected to output ports 350 and an associated scheduler.

Output ports 350 may connect network device 110 to networks 130 and 140 for data transmission. For example, output ports 350 may output data to be transmitted over a network, such as networks 130 and 140. For example, output ports 350 of network device 110-0 may output data via links 120-0 and 120-5 and may output or transmit data packets to network 140-1, as shown in FIG. 1.

Control unit 360 may control operations of network device 110 and may control transmissions with other network devices in order to configure data paths. For example, control unit 360 may implement routing protocols, and/or run software to configure transmissions between networks 130 and 140.

In one implementation, control unit 360 may include a communication interface 370, a processor 380, and memory 390. Communication interface 370 may include any transceiver-like mechanism that enables control unit 360 to communicate with other devices and/or systems. Processor 360 may include a microprocessor or processing logic that may interpret and execute instructions. Memory 390 may include a random access memory (RAM), a read-only memory (ROM) device, a magnetic and/or optical recording medium and its corresponding drive, and/or another type of static storage device that may store information and instructions for execution by processor 380.

Network device 110, consistent with principles of the invention, may perform certain operations, as described herein. Network device 110 may perform these operations in response to processor 380 executing software instructions contained in a computer-readable medium, such as memory 390. A computer-readable medium may be defined as a physical or logical memory device.

The software instructions may be read into memory 390 from another computer-readable medium, such as a data storage device, or from another device via communication interface 370. The software instructions contained in memory 390 may cause processor 380 to perform control processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of network device 110, in other implementations, network device 110 may include fewer, different, or additional components than depicted in FIG. 3. In still other implementations, one or more components of network device 110 may perform the functions of one or more other components of network device 110.

FIG. 4 is an exemplary ingress data structure 400 that may be contained in ingress memory 321 associated with ingress packet processor 320 of network device 110, for example. Ingress data structure 400 may be used to direct data packets within switching mechanism 330, received via input ports 310, and may result in changing and/or adding LSP labels to a received data packet. Ingress data structure 400 may include a variety of information. For example, ingress data structure 400 may include a LSP Label column 410, an Action column 420, an Out Label column 430, a Next Label column 440, an EXP column 450, an Ingress Connection identification (ID) column 460, and an Egress connection ID column 470.

Column 410 of ingress data structure 400 may contain label information relating to an incoming LSP labeled data packet. For example, column 410 may store information such as "L1," "L2," "L3," and "L4," where these identifiers may represent a twenty bit LSP label (e.g., LSP label field 210 as shown in FIG. 2).

Column 420 of ingress data structure 400 may contain action identifier information relating to an action to be performed by ingress packet processor 320. For example, column 420 may store information such as "A1," "A2," and "A3," where these identifiers may represent an action to be performed by ingress packet processing block 320. For example, "A1" may represent a LSP label swap operation, "A2" may represent a LSP tunnel operation, and "A3" may represent a LSP label pop operation.

Column 430 of ingress data structure 400 may contain outgoing label information relating to an outgoing label. For example, column 430 may store identifiers "OL1," "OL2," "OL3," and "OL4," where such identifiers may represent or identify an outgoing LSP label that may be applied to a received data packet. These identifiers are interpreted in the context of the action in column 420. For instance, if the action is to swap, this field will contain the outgoing label value. If the action is to pop, this field will be NULL, and if the action is to tunnel this field will contain a pointer to the tunnel data structure. The identified outgoing labels, if any, may be used to transmit data packets to a next network device 110 in network 130, for example.

Column 440 of ingress data structure 400 may contain next label information relating to additional LSP labels that may be applied to a received data packet. For example, column 440 may store "NL1" to identify or point to tunneling data structure to apply an additional LSP label and other information that pertain to forwarding the tunneled packet. Also, for example, column 440 may store information, such as "NL2," which may represent null information if no additional LSP label is required for data transmission through network 130.

Column 450 of ingress data structure 400 may contain exp information related to values in exp field 220 of an incoming label. For example, column 450 may store exp maps "E1," "E2," "E3," and "E4," where each entry in a map maps an exp value to a device-internal Class of Service value, for example. An exp field 220 of a received labeled data packet is mapped to a device-internal Class of Service value by matching the exp value to an entry in this map. The device-internal Class of Service is then used to identify the input queue out of a set of queues associated with the ingress Traffic Manager 322 to which the packet should be enqueued.

Column 460 of ingress data structure 400 may store ingress identification information relating to ingress queues. For example, column 460 may store identifiers "INID1," "INID2," "INID3," and "INID4," where such identifiers may determine or identify input queues and/or internal device class of service information.

Column 470 of ingress data structure 400 may contain information identifying an egress data structure. For example, column 470 may store identifiers "EGID1," "EGID2," "EGID3," and "EGID4," where such identifiers may determine or identify an egress data structure used to map labeled packets to output queues in egress Traffic Manager 342 to output ports 350.

Upon receiving data from network 140, via input ports 310 for example, network device 110 (which may be configured as an ingress LSR) may form a data packet, and may classify the data packet, based on a network service, into a forwarding equivalent class (FEC). For example, a FEC may include a set of data packets that may be treated the same for forwarding purposes and may be mapped to a single LSP. In this manner, different network services may be mapped to LSP labels as stored in column 410 of ingress data structure 400. Additionally, a quality of service for each network service may be further determined by appropriately marking the exp bits as a result of classification. Network device 110 may then forward a data packet with a LSP label to the next-hop LSR, e.g., to a next network device 110. In this manner, after a data packet has been labeled and output by network device 110, it may forwarded along links 120 through MPLS network 130 based on the LSP label applied. An LSR extracts the MPLS label from a received packet and performs a lookup that results in an ingress data structure 400. A LSP label may be swapped to a new label at each network device 110. In this way, a LSP label may identify the specific path of network devices 110 and links 120 that a data packet may take through MPLS network 130.

Although FIG. 4 shows exemplary information that may be included in ingress data structure 400, in other implementations, ingress data structure 400 may include fewer, different, or additional information than depicted in FIG. 4.

Figure 5:
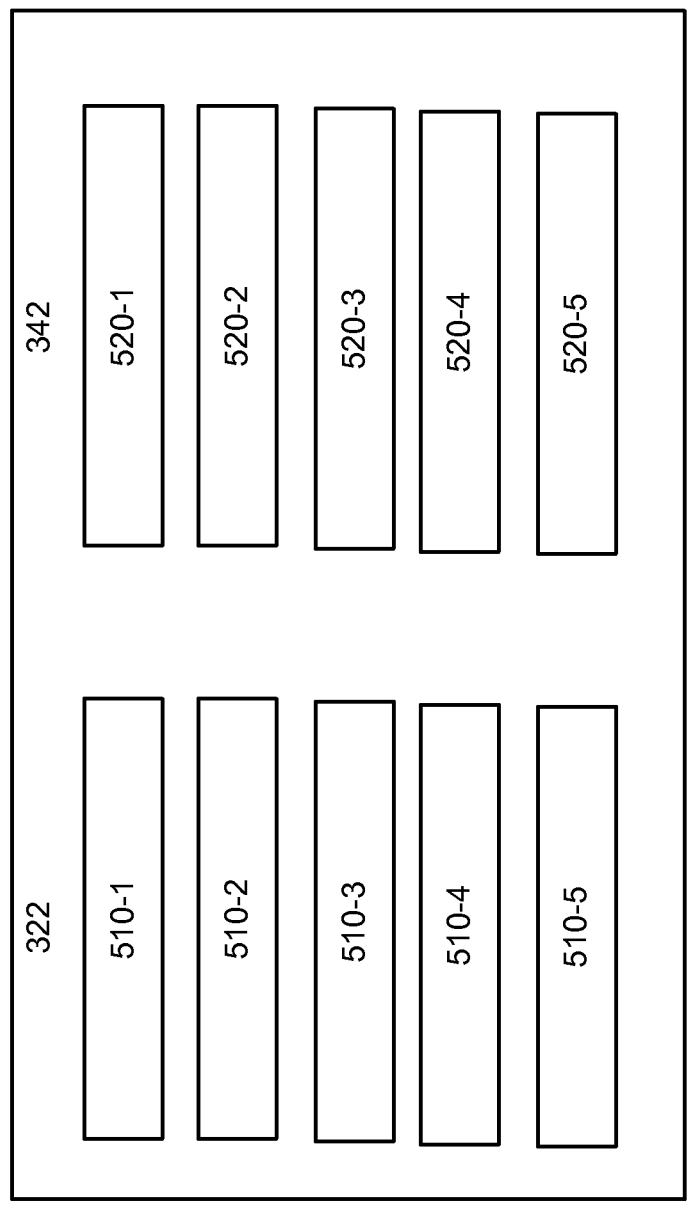
FIG. 5 is a block diagram of queues that may be provided in the exemplary network device of FIG. 3.

FIG. 5 shows exemplary queues that may store data within ingress Traffic Manager 322 and egress Traffic Manager 342 of network device 110. For example, ingress Traffic Manager 322 may contain a number of input queues 510-1, 510-2, 510-3, 510-4 and 510-5 (referred to collectively as "input queues 510") and egress Traffic Manager 342 may contain a number of output queues 520-1, 520-2, 520-3, 520-4 and 520-5 (referred to collectively as "output queues 520").

Input queues 510 may contain memories for storing data. Each input queue 510 may further contain a number of individually addressable buffers. Input queues 510 may receive data, via input ports 310, which may be received from network 140. Data may be directed to be stored in particular input queues 510 as determined by data structure 400. For example, column 460 of ingress data structure 400 may store ingress identification information "INID1," which may be associated with input queue 510-1. Alternatively, the exp map in column 450 may result in a device-internal class of service identifier that is subsequently used to identify a queue.

Output queues 520 may contain memories for storing data. Each output queue 520 may further contain a number of individually addressable buffers. Output queues 520 may receive data from input queues 510 whereby the output queue is determined based on data structure 600, as described below.

Figure 6:
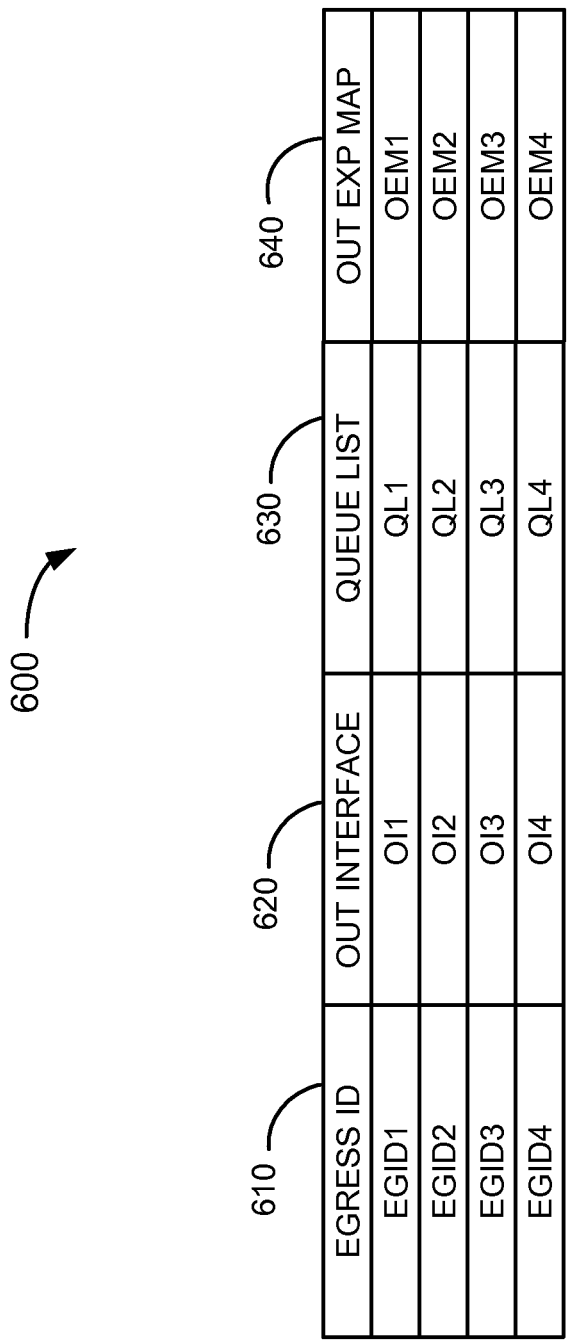
FIG. 6 depicts exemplary data structures that may be stored in the exemplary network device of FIG. 3.

FIG. 6 shows an exemplary egress data structure 600 that may be contained in network device 110, for example. In one implementation, egress data structure 600 may be contained in memory 340.1 associated with egress packet processor 340. In one example, egress data structure 600 may be used to map received data from input queues 510 via switching mechanism 330 to output queues 520. Egress data structure 600 may include a variety of information. For example, egress data structure 600 may include an Egress ID column 610, an Out Interface column 620, a Queue List column 630, and Out EXP Map column 650.

Column 610 of egress data structure 600 may contain information identifying a defined egress data structure. For example, column 610 may store identifiers, such as "EGID1," "EGID2," "EGID3," and "EGID4," where such identifiers may represent or identify an egress ID data structure. Information in column 470 of ingress data structure 400 may be used to point to information stored in column 610 of egress data structure 600.

Column 620 of egress data structure 600 may contain information identifying an output interface. For example, column 620 may store "OI1," "OI2," "OI3" and "OI4" where these identifiers may represent a specific output port within output ports 330.

Column 630 of egress data structure 600 may contain information identifying the head of a queue list. For example, column 630 may store identifiers, such as "QL1," "QL2," "QL3," and "QL4," where these identifiers may represent or identify queue lists.

Column 640 of egress data structure 600 may contain information identifying individually addressable queues within an output queue list. For example, column 640 may store identifiers, such as "OEM1," "OEM2," "OEM3," and "OEM4," where these identifiers may represent or identify information that may be used to map data packets to individually addressable queues within an output queue list and an outgoing exp value. For example, using the associated queue list information in column 630, which may identify a specific output queue list, information in column 640 may further define which individually addressable queues to use within the determined output queue list. For example, "OEM1" may itself be an array list indexed by the packet exp value whereby each entry in the array may contain an offset value from the head of the queue list, identifying an individual queue in that list. OME1 array size may be eight for instance, indicating that data packets may be stored in up to eight queues (e.g., queues one to eight) individually addressable within an output queue list. There can be one or more drop priority profiles that may apply to each queue. The returned data structure obtained by indexing via the packet exp value in the array (e.g., OEM1) may also contain drop profile information that applies to that queue and corresponding exp value written in the exp field of the outgoing packet. It should be noted that using these data structures, exp values may be associated with the same or different queues and once associated with a queue, packets with different exp values can have the same or different drop profiles. As result of the ingress and egress processing, the queue list is identified by a packet label value and the individual queue is identified by the exp value in that queue list. Thus, both the label and exp value are used to identify the queuing behavior that a packet may receive.

Although FIG. 6 shows exemplary information that may be included in egress data structure 600, in other implementations, egress data structure 600 may include fewer, different, or additional information than depicted in FIG. 6.

FIG. 7 illustrates exemplary processing 700 capable of being performed by network device 110. In one implementation, for example, processing 700 may begin with receipt of a LSP labeled data packet (block 710). For example, network device 110-0 may receive a LSP labeled data packet (as shown in FIG. 2) from network 140-1. The LSP labeled data packet may be received via input ports 310 of network device 110-0.

Upon receiving a LSP labeled data packet, an ingress data structure may be accessed (block 720). For example, the received LSP labeled data packet may be labeled with label "L3." Ingress packet processor 320 may access data ingress data structure 400 within memory 321. The incoming label "L3" may be searched within column 410 of data structure 400. Once the incoming label has been matched to a label stored in column 410, the associated processes determined by data stored in columns 420-470 may be performed. For example, incoming label "L3" may be associated with action "A3" (e.g., a label swap operation) which may instigate the ingress packet processor 320 to switch the label (L3) of the incoming LSP labeled data packet to another label (OL3) as determined by column 430, for example. Further, information in column 450 and/or information in column 460 may be used to determine the input queue 510 used for storing the incoming data packet. In this example, ingress ID "INID3" stored in column 460 may indicate or map incoming data to be stored in input queue 510-3. In another example, using exp information "E3" in column 450 and/or ingress ID "INID3" stored in column 460, switching mechanism 320 may map incoming data to be stored in input queue 510-1.

As further shown in FIG. 7, after accessing data structure 400, the received data packet may be stored in the determined input queue 510 (block 730). The packet is then switched for egress packet processing where an, egress data structure 600 may be accessed (block 740). For example, ingress packet processor 320 may map information from data structure 400 to access information in data structure 600. In this example, using egress ID information "EGID3" stored in column 470 of ingress data structure 400, egress packet processor 340 may search column 610 of egress data structure 600 to find "EGID3." If the egress ID information stored in column 470 of ingress data structure 400 has been matched to egress ID information stored in column 610 of egress data structure 600, associated information stored in columns 620-640 may be used to enable further processing of data. For example, outgoing interface information "OI3" stored in column 620 may be used to identify a specific output port 330 of network device 110 from which the data packet may be transmitted. Continuing with this example, queue list information stored in column 630 (e.g., "QL3") may identify an output queue list. Additionally, information in column 640 may be used to identify individually addressable queues within the output queue list and the drop profile that must be applied to that packet. For example, "QL3" may identify an output queue list and using the received exp value "E3," Out EXP Map information "OEM3" stored in column 640 may map data packets to specifically identified queues within the output queue list and associated drop profile. For example, "OEM3" may identify queues one to eight within output queue list QL3 and exp value in the data packet used to identify the individual queue.

After accessing egress data structure 600 as described above, the data may be received and stored in the determined output queue(s) (block 750). Once stored in an output queue, for example, output queue 520, data may then be transmitted (block 760). For example, data transmitted from network device 110-0 may be directed to network device 110-5. Upon receiving data from network device 110-1, network device 110-5 may process a LSP labeled data packet as described above in blocks 710-760. Each network device 110 that receives the forwarded LSP data packet may continue to transmit the data until the data is received by network 140-2. As described above, the exact data path may be determined by factors within network 130, such as avoiding congestion.

When using a label distribution protocol such a the resource reservation protocol with traffic engineering capability (RSVP-TE) or a any other protocol that is able to setup an MPLS labeled path and able to carry the necessary information specified hereafter is used to signal an LSP across multiple network devices 110, the signaling may include an identifier of the queue group (synonymous with a network service) and the classes of service (CoS) within the context of the network service to which the packets carried over that LSP may belong. The exemplary embodiments described herein allow for the group and classes of service to be identified separately in the signaling message or that the class of service identifier identifies the CoS and implicitly the network service. At each network device 110 that processes the signaling message, a map must be defined between the identifier(s) carried in the signaling and the queues locally on that network element. Using this exemplary type of signaling, a network device 110 in network 130 may form and program an ingress data structure 400 and an egress data structure 600. In this manner, each network device 110 may be configured to provide specific quality of service (QoS) requirements for each type of network service based on LSP labels and exp values together. As an alternative to signaling a network service, a label or a label range at each network device 110 can be associated with a network service. That label or label range can in turn be associated with a set of queues at a network device 110.

Process 700 may provide requested quality of service (QoS) and/or network services between two networks (140-1 and 140-2) over MPLS network 130. It should also be understood that process 700 is exemplary, and more than one MPLS network 130 may be included between networks 140-1 and 140-2. In this case, the exemplary acts as described above may also be applied to all of the networks.

The foregoing description of exemplary embodiments provides illustration and description, but is not intended to be exhaustive or to limit the embodiments to the precise form disclosed. Modifications and variations are possible in light of the above teachings or may be acquired from practice of the embodiments.

Also, while series of acts have been described with regard to the flowchart of FIG. 7, the order of the acts may differ in other implementations consistent with principles of the embodiments. Further, non-dependent acts may be performed in parallel.

No element, act, or instruction used in the present application should be construed as critical or essential to the systems and methods described herein except when explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A non-transitory computer readable medium to store instructions, the instructions including:
   one or more instructions that, when executed by one or more processors included in a network device, cause the one or more processors to receive data packet,
      the data packet including:
         a label-switched-path (LSP) value, and
         an experimental (EXP) value;
   one or more instructions that, when executed by the one or more processors, cause the one or more processors to map, based on the LSP value, the data packet to an input queue,
      the input queue being selected, based on the LSP value, from a plurality of input queues associated with the network device;
   one or more instructions that, when executed by the one or more processors, cause the one or more processors to map, based on the EXP value and the input queue, the data packet to an output queue,
      the output queue being selected, based on the EXP value, from a plurality of output queues associated with the network device; and
   one or more instructions that, when executed by the one or more processors, cause the one or more processors to transmit the data packet from the output queue toward a destination.

2. The non-transitory computer readable medium of claim 1, where the one or more instructions to map the data packet to the output queue further include:
   one or more instructions to determine, based on data in the data packet, an egress identifier for the data packet
      the output queue being selected from the plurality of output queues associated with the network device further based on the egress identifier.

3. The non-transitory computer readable medium of claim 1, where the one or more instructions to map the data packet to the output queue further include:
   one or more instructions to:
      identify individually addressable output queues included in the plurality of output queues;
      identify, at the output queue, an individually addressable output queue, of the individually addressable output queues, based on the EXP value; and
      map the data packet to the individually addressable output queue.

4. The non-transitory computer readable medium of claim 1, where the LSP value is associated with a network service.

5. The non-transitory computer readable medium of claim 1, where the LSP value is included in an LSP value range, and where the LSP value range is associated with a network service.

6. The non-transitory computer readable medium of claim 1, where the instructions further include:
   one or more instruction to identify, based on data in the data packet, an output port to receive the data packet from the output queue,
      the output queue being selected from the plurality of output queues further based on the output port.

7. The non-transitory computer readable medium of claim 1, where the one or more instructions to map the data packet to the input queue include:
   one or more instructions to:
      determine respective sets of LSP values for the plurality of input queues;
      identify a respective set, of the respective sets of LSP values, that includes the LSP value included in the data packet,
         the respective set being associated with a particular input queue; and
      select, as the input queue, the particular input queue.

8. A method comprising:
   receiving, by a network device, a data packet,
      the data packet including:
         a label-switched-path (LSP) value, and
         an experimental (EXP) value;
   mapping, by the network device and based on the LSP value, the data packet to an input queue,
      the input queue being selected, based on the LSP value, from a plurality of input queues, associated with the network device;
   mapping, by the network device and based on the EXP value and the input queue, the data packet to an output queue,
      the output queue being selected from a plurality of output queues, associated with the network device, based on the EXP value; and
   transmitting, by the network device, the data packet from the output queue toward a destination.

9. The method of claim 8, where mapping the data packet to the input queue includes:
   determining respective sets of LSP values for the plurality of input queues,
   identifying a respective set, of the respective sets of LSP values, that includes the LSP value included in the data packet,
      the respective set being associated with a particular input queue; and
   selecting, as the input queue, the particular input queue.

10. The method of claim 8, where mapping the data packet to the output queue includes:
  identifying individually addressable output queues included in the plurality of output queues;
  identifying, as the output queue, an individually addressable output queue, of the individually addressable output queues, based on the EXP value; and
  mapping the data packet to the individually addressable output queue.

11. The method of claim 8, where mapping the data packet to the output queue includes:
  storing, in a data structure, data mapping respective sets of EXP values to the plurality of output queues; and
  using the data structure to select the output queue based on the EXP value.

12. The method of claim 8, where the LSP value is associated with a network service.

13. The method of claim 8, where the LSP value is included in an LSP value range, and
  where the LSP value range is associated with a network service.

14. The method of claim 8, further comprising:
  identifying, based on data in the data packet, an output port to receive the data packet from the output queue,
  the output queue being selected from the plurality of output queues further based on the output port.

15. A device comprising:
  a switching mechanism to switch a data packet, received through an input port, to an output port,
  the switching mechanism including input queues and output queues;
  a processor to:
  determine:
    a label-switched-path (LSP) value associated with the data packet, and
    an experimental (EXP) value associated with the data packet, map, based on the LSP value, the data packet to an input queue of the input queues,
    the input queue being selected based on the LSP value, and
  map, based on the EXP value and the input queue, the data packet to an output queue of the output queues,
    the output queue being selected based on the EXP value.

16. The device of claim 15, where the processor is further to:
  store information associating respective sets of EXP values with the output queues,
    the processor mapping the data packet to the output queue further based on identifying a particular set, of the respective sets of EXP values, associated with the EXP value.

17. The device of claim 15, where the LSP value is associated with a network service.

18. The device of claim 17, where the LSP value is within an LSP range associated with the network service.

19. The device of claim 15, where the device is included in a Multi-Protocol Label Switching (MPLS) network.

20. The device of claim 15, where the processor, when mapping the data packet to the input queue, is further to:
  assign, based on the LSP value, an egress identifier to the data packet,
  identify, based on the egress identifier, the output queue from the output queues.

* * * * *